(12) United States Patent
Stathacopoulos et al.

(10) Patent No.: US 11,044,331 B2
(45) Date of Patent: Jun. 22, 2021

(54) METHODS AND SYSTEMS FOR RECOMMENDING MEDIA CONTENT

(71) Applicant: Rovi Guides, Inc., San Jose, CA (US)

(72) Inventors: Paul Stathacopoulos, San Carlos, CA (US); Benjamin Maughan, Pleasanton, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/122,026

(22) Filed: Sep. 5, 2018

(65) Prior Publication Data

US 2019/0020726 A1   Jan. 17, 2019

Related U.S. Application Data

(63) Continuation of application No. 14/634,640, filed on Feb. 27, 2015, now Pat. No. 10,097,648.

(51) Int. Cl.
*H04L 29/08* (2006.01)
*G06Q 10/00* (2012.01)
*G06Q 50/00* (2012.01)
*H04L 12/58* (2006.01)

(52) U.S. Cl.
CPC ............ *H04L 67/22* (2013.01); *G06Q 10/00* (2013.01); *G06Q 50/01* (2013.01); *H04L 51/14* (2013.01); *H04L 51/32* (2013.01)

(58) Field of Classification Search
CPC ............................... H04L 67/22; H04L 76/22
USPC ...................................................... 709/224
See application file for complete search history.

(56) References Cited

U.S. PATENT DOCUMENTS

| | | | |
|---|---|---|---|
| 6,239,794 B1 | 5/2001 | Yuen et al. | |
| 6,388,714 B1 | 5/2002 | Schein et al. | |
| 6,564,378 B1 | 5/2003 | Satterfield et al. | |
| 6,756,997 B1 | 6/2004 | Ward, III et al. | |
| 7,076,504 B1 | 7/2006 | Handel et al. | |
| 7,165,098 B1 | 1/2007 | Boyer et al. | |
| 7,389,294 B2 | 6/2008 | Kotas et al. | |
| 7,545,784 B2 * | 6/2009 | Mgrdechian | G06Q 30/0207 370/338 |
| 7,730,143 B1 | 6/2010 | Appelman | |
| 7,747,706 B2 | 6/2010 | Ran | |
| 7,761,892 B2 | 7/2010 | Ellis et al. | |
| 7,765,484 B2 | 7/2010 | Roskind | |
| 7,904,511 B2 | 3/2011 | Ryan et al. | |
| 8,046,801 B2 | 10/2011 | Ellis et al. | |
| 8,595,167 B1 * | 11/2013 | Grieve | H04L 51/32 706/45 |

(Continued)

OTHER PUBLICATIONS

Spratley, "What Does 'Mutual Friend' Mean?", 2019 (Year: 2019).*

(Continued)

*Primary Examiner* — Ondrej C Vostal
(74) *Attorney, Agent, or Firm* — Haley Guiliano LLP

(57) ABSTRACT

Methods and systems are disclosed herein for a media guidance application that provides diverse and reliable media content suggestions. Specifically, the media guidance application may monitor user preferences of a select group of friends of the user and base media recommendations on those user preferences. The media guidance application may determine close friends of the user, such as friends that a user regularly communicates with, and include recommendations on the media preferences of only those close friends.

14 Claims, 4 Drawing Sheets

(56) References Cited

U.S. PATENT DOCUMENTS

| | | | |
|---|---|---|---|
| 8,595,228 B1* | 11/2013 | Horling | G06F 16/24578 707/733 |
| 8,639,757 B1* | 1/2014 | Zang | G06Q 50/01 709/204 |
| 8,719,347 B1* | 5/2014 | Tomkins | G06F 12/06 709/204 |
| 8,752,172 B1 | 6/2014 | Dotan et al. | |
| 8,880,941 B1 | 11/2014 | Reiss et al. | |
| 8,909,646 B1* | 12/2014 | Fabrikant | G06F 16/287 707/737 |
| 9,027,105 B1* | 5/2015 | Saylor | H04W 4/80 726/7 |
| 9,129,227 B1* | 9/2015 | Yee | G06F 16/335 |
| 2002/0174430 A1 | 11/2002 | Ellis et al. | |
| 2003/0110499 A1 | 6/2003 | Knudson et al. | |
| 2003/0200156 A1 | 10/2003 | Roseman et al. | |
| 2005/0033657 A1 | 2/2005 | Herrington et al. | |
| 2005/0251827 A1 | 11/2005 | Ellis et al. | |
| 2007/0266097 A1* | 11/2007 | Harik | G06Q 30/02 709/204 |
| 2008/0177994 A1 | 7/2008 | Mayer | |
| 2008/0189122 A1 | 8/2008 | Coletrane et al. | |
| 2008/0248815 A1 | 10/2008 | Busch | |
| 2008/0312948 A1 | 12/2008 | Kalliola et al. | |
| 2009/0182872 A1 | 7/2009 | Hong | |
| 2009/0222551 A1 | 9/2009 | Neely et al. | |
| 2009/0307345 A1 | 12/2009 | Carter et al. | |
| 2010/0153885 A1 | 6/2010 | Yates | |
| 2010/0174813 A1* | 7/2010 | Hildreth | G06Q 10/107 709/224 |
| 2010/0223341 A1 | 9/2010 | Manolescu et al. | |
| 2010/0241507 A1 | 9/2010 | Quinn et al. | |
| 2011/0106895 A1* | 5/2011 | Ventilla | G06Q 10/10 709/206 |
| 2011/0238755 A1* | 9/2011 | Khan | H04W 4/21 709/204 |
| 2012/0134287 A1 | 5/2012 | Turunen et al. | |
| 2012/0240062 A1 | 9/2012 | Passmore et al. | |
| 2012/0254099 A1* | 10/2012 | Flinn | G06F 40/20 706/52 |
| 2012/0290518 A1* | 11/2012 | Flinn | G06F 16/24575 706/12 |
| 2012/0317123 A1* | 12/2012 | Green | G06F 16/437 707/748 |
| 2013/0041755 A1 | 2/2013 | Lyanoy et al. | |
| 2013/0054706 A1 | 2/2013 | Graham et al. | |
| 2013/0054711 A1 | 2/2013 | Kessner et al. | |
| 2013/0058274 A1* | 3/2013 | Scherzer | H04L 63/107 370/328 |
| 2013/0091223 A1 | 4/2013 | DeLuca et al. | |
| 2013/0259216 A1* | 10/2013 | Adzhamyan | H04M 3/42229 379/201.02 |
| 2014/0019544 A1* | 1/2014 | Palmert | H04L 51/32 709/204 |
| 2014/0074896 A1 | 3/2014 | Bushman et al. | |
| 2014/0115082 A1 | 4/2014 | Korst et al. | |
| 2014/0136621 A1* | 5/2014 | Korst | G06Q 50/01 709/204 |
| 2014/0156746 A1* | 6/2014 | Wheatley | H04L 67/22 709/204 |
| 2014/0207950 A1 | 7/2014 | Badiee et al. | |
| 2014/0280226 A1* | 9/2014 | Wilson | G06Q 30/0631 707/748 |
| 2014/0298386 A1 | 10/2014 | Dasgupta et al. | |
| 2014/0358607 A1* | 12/2014 | Gupta | G06Q 10/063112 705/7.14 |
| 2015/0058720 A1 | 2/2015 | Smadja et al. | |
| 2015/0169705 A1* | 6/2015 | Korbecki | G06F 16/248 707/736 |
| 2015/0169744 A1* | 6/2015 | Walkingshaw | G06Q 30/0251 707/738 |
| 2015/0172227 A1 | 6/2015 | Grove | |
| 2015/0207765 A1 | 7/2015 | Brantingham et al. | |
| 2015/0281163 A1 | 10/2015 | Bastide et al. | |
| 2015/0281329 A1* | 10/2015 | Dimov | H04L 67/1097 709/217 |
| 2015/0339287 A1 | 11/2015 | Bastide et al. | |
| 2015/0379406 A1* | 12/2015 | Savage | G06Q 50/01 706/11 |
| 2016/0087924 A1 | 3/2016 | Ramalingam et al. | |
| 2016/0087925 A1 | 3/2016 | Kalavagattu et al. | |
| 2016/0154556 A1 | 6/2016 | Cheung et al. | |
| 2016/0165065 A1 | 6/2016 | Damstra | |
| 2016/0196490 A1 | 7/2016 | Chandrasekaran et al. | |
| 2016/0241576 A1 | 8/2016 | Rathod et al. | |

OTHER PUBLICATIONS

Extended European Search Report EP Application No. 18186193.1 dated Oct. 17, 2018.

International Search Report, International Application No. PCT/US2016/019536, dated May 10, 2016 (11 pages).

Microsoft Computer Dictionary, "real-time", 5$^{th}$ Edition, 2002, p. 441.

Kim, "Internet-centric solution is more than moving online", 2015 (Year: 2015).

Microsoft Computer Dictionary, "real-time", 2002, p. 441 (Year: 2002).

Merriam-Webster, "exchange", 2017.

* cited by examiner

METHODS AND SYSTEMS FOR RECOMMENDING MEDIA CONTENT

CROSS-REFERENCE TO RELATED APPLICATIONS

This application is a continuation of U.S. patent application Ser. No. 14/634,640, filed Feb. 27, 2015, currently allowed, the disclosure of which is hereby incorporated by reference herein in its entirety.

BACKGROUND

In conventional systems, users have access to a plethora of media content. With so much content available, users often require assistance in selecting content, and content providers often require assistance in selecting what content recommendations to provide to a user. Current systems to aid in selecting media content often assess a user's media interest by passively or actively collecting data related to what content a user watches (or does not watch), what content that a user enjoys (or dislikes), etc. Such systems are limited to basing recommendations on previously engaged content and as such fail to adequately and accurately provide new media suggestions that can anticipate diverse or changing user preferences.

SUMMARY

Accordingly, methods and systems are described herein for a media guidance application that provides diverse and reliable media content suggestions, as well as anticipating changes to the user's preferences. Specifically, the media guidance application may monitor user preferences of a select group of friends of the user and base media recommendations on those user preferences. Furthermore, to more precisely tailor media recommendations to the user and to anticipate changes in the preferences of the user, the media guidance application may include only close friends (i.e., friends that a user regularly communicates with) in the selected group, as the preferences of close friends are more likely to indicate the current preferences of a user than mere acquaintances of the user. For example, the media guidance application may determine close friends by calculating a "closeness metric" for friends in a user's social network and comparing this closeness metric to a recommendation threshold, which may distinguish close friends from mere acquaintances. The media guidance application may then make media content recommendations based on the media consumption and preferences of only the close friends.

In some aspects, the media guidance application may store, in a database, a record of a social media network contact. The social media network contact record(s) may be obtained or generated from a user's connections on a social media network profile or a subset of these connections.

The media guidance application may then monitor electronic communications between a user and a social media network contact. For example, the media guidance application may monitor the electronic communications (e.g., e-mail messages, text messages, microblog posts, posts to a social network website page, etc.) between a first social media network profile, corresponding to the user, and a second social media network profile, corresponding to the social media network contact.

Based on the monitored electronic communications, the media guidance application may generate a closeness metric that quantifies an amount of electronic communication between the user and the social media network contact. For example, by measuring the amount and/or frequency of posts, e-mails, etc., the media guidance application, may determine a particular level of friendship between two users. Moreover, in some embodiments, the values assigned to the closeness metric for communication between a user and another user may be relative to the user's overall amount or frequency of communication. For example, communications sent by a user that frequently communicates with other users may weigh less heavily in a determination of a closeness metric for that user than a user that does not frequently communicate with other users.

The media guidance application may then store a closeness metric corresponding to the social media network contact in the database. Furthermore, in some embodiments, the closeness metric may be dynamically updated while stored. For example, in response to a detection of an electronic communication between the user and the social media network contact, the value of the closeness metric may increase. In contrast, the failure to detect an electronic communication between the user and the social media network contact during a predetermined time period may decrease the value of the closeness metric.

The media guidance application may retrieve a recommendation threshold from the database and compare the recommendation threshold to the closeness metric. If the closeness metric for a social media network contact meets and/or exceeds the recommendation threshold, then the media guidance application will generate, for display, on a display device, a media content recommendation based on the social media network contact. Conversely, if the closeness metric for a social media network contact does not meet and/or exceed the recommendation threshold, then the media guidance application will not generate a media content recommendation based on the social media network contact.

In some embodiments, the media guidance application may use various criteria to refine its determination of whether two users are sufficiently close. For example, the value of the closeness metric may be based on the length of time corresponding to the electronic communications between the user and the social media network contact. In another example, the value of the closeness metric may be based on the number of different types of the electronic communication between the user and the social media contact. In another example, the value of the closeness metric may also be based on a combination of any modes of assessing electronic communication (e.g., the number, frequency, duration, or variety of communications). In yet another example, the different means of electronic communication (e.g., e-mail messages, text messages, microblog posts, or posts to a social network website page) and/or the different modes of assessing electronic communication may be weighted or ranked in closeness metric calculations.

It should be noted that the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF THE DRAWINGS

Figure 1:
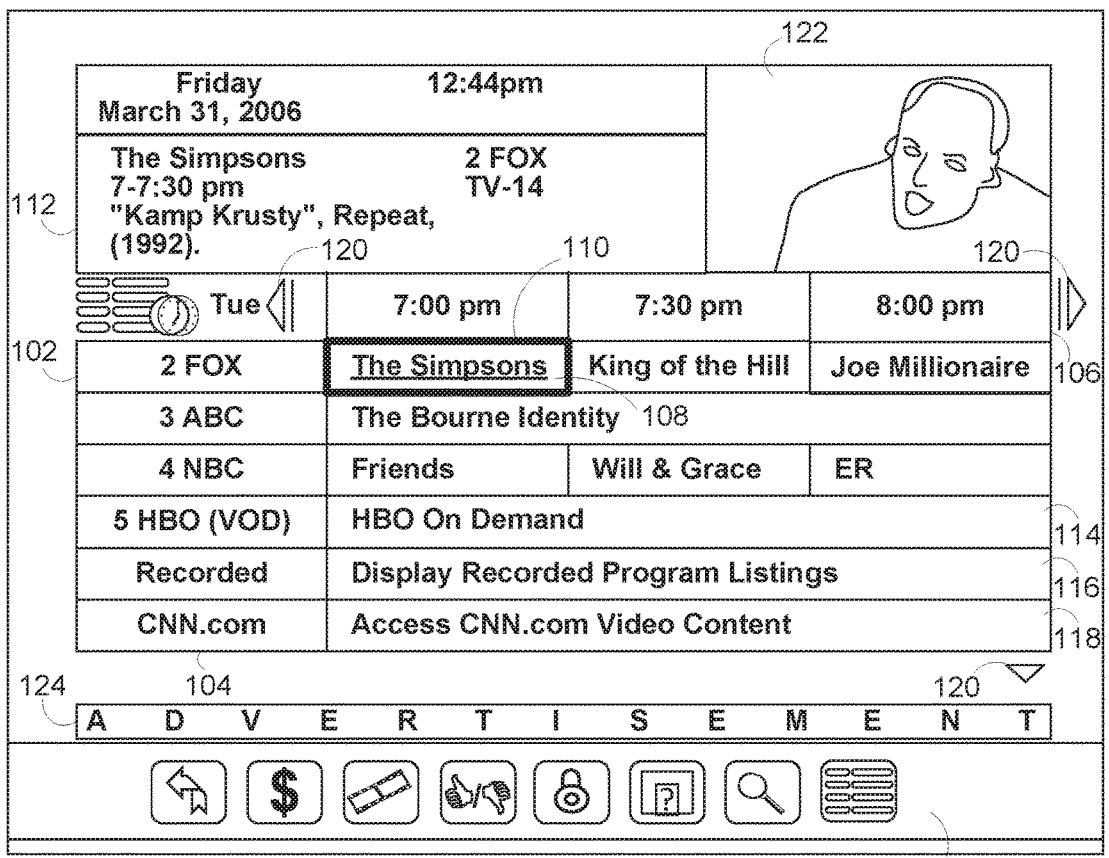
FIG. 1 shows an illustrative example of a display screen generated by a media guidance application in accordance with some embodiments of the disclosure.

Methods and systems are described herein for a media guidance application that provides diverse and reliable media content suggestions as well as anticipates changes to the user preferences. Specifically, the media guidance application may monitor user preferences of a select group of friends of the user and base media recommendations on those user preferences. Furthermore, to more precisely tailor media recommendations to the user and to anticipate changes in the preferences of the user, the media guidance application may include only close friends (i.e., friends a user regularly communicates with) in the selected group as the preferences of close friends are more likely to indicate the current preferences of a user than the preferences of mere acquaintances of the user.

As referred to herein, an interactive media guidance application or, sometimes, a media guidance application or a guidance application is an application that provides media guidance through an interface that allows users to efficiently navigate content selections and/or easily identify content that they may desire.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

Media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens.

In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a website), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

In order to help a user identify content that her or she may desire, the media guidance application may provide media content suggestions or recommendations or, simply, media recommendations or media suggestions. For example, the media guidance application may make media content recommendations based on the media consumption and preferences of friends in a user's social network. As used herein, a "social network," refers to a platform that facilitates networking and/or social relations among people who, for example, share interests, activities, backgrounds, and/or real-life connections. In some cases, social networks may facilitate communication between multiple user devices (e.g., computers, televisions, smartphones, tablets, etc.) associated with different users by exchanging content from one device to another via a social media server. As used herein, a "social media server" refers to a computer server that facilitates a social network. For example, a social media server owned/operated/used by a social media provider may make content (e.g., status updates, microblog posts, images, graphic messages, etc.) associated with a first user accessible to a second user that is within the same social network as the first user. In some embodiments, the social media network is an online social network such as Facebook, LinkedIn, Twitter, Pinterest, MySpace, Google Plus, YouTube, Reddit, Flickr, Digg, etc.

In some embodiments, the media guidance application may store (e.g., in a database) a record of a social network contact. The social network contact record may be obtained or generated from a user's connections on a social network profile or a subset of these connections. For example, the media guidance application may retrieve a list of entities such as friends (e.g., a social network buddy list), contacts (e.g., retrieved from a phone/text message/e-mail account associated with the user), social networks, and/or public services (e.g., hospitals, police departments, schools, etc.) with known associations to the user or the community of the user and generate a list of social contacts. Additionally or alternatively, a user may manually enter social network contacts. In some embodiments, a subset of social contacts may be selected from the social contact list based on different criteria (e.g. amount of communications, common interests, number of mutual connections, manual selection, etc.). The media preferences of the social contacts or a subset of social contacts may be monitored to generate media content recommendations, described in more detail below.

In some social networks, users may generate social media network profiles. As used herein, a "social media network profile" or "social media profile" is a collection of information associated with one or more people, groups of people, and/or other entity that is stored on the social media server. The information included in a profile may be varied and describe any aspect relating to a user, interaction between a user and other users, and/or an interaction with the user and media content. For example, a social media profile may include demographic information about the user (e.g. age, location, gender, employment information, etc.), information about their social network (e.g. the number and identity of other social media contacts) as well as information related to the media consumption and/or media interests of the user.

As used herein, "friends" in a social media network, which may also be referred to as social media network contacts or social media contacts, are classes of entities that may refer to other users that have been granted the ability to communicate with a first user and/or a level of access to content associated with a first user (e.g. photos, profile information etc.). In some social media networks, becoming friends may grant the user the ability to perform various social interactions with the user such as making written comments on various aspects of the user's profile page (e.g. photos, status updates, etc.), posting content to the user's profile page (e.g. written comments, photos, other media, or a combination thereof), tagging a user in various online media content and/or communicating with the user via instant messaging or e-mail features.

In some embodiments, the media guidance application may determine a list or quantity of common friends between the user and the social network contact. For example, the media guidance application may access the list of contacts of the social network contact (e.g., a social network buddy list, electronic address book, etc), and compare the contact list of the user with the contact list of the social network contact to identify or quantify mutual contacts. In another example, some online social networks (e.g. Facebook, LinkedIn, etc.) automatically generate a list of mutual contacts between a user and a social network contact. The media guidance application may directly access this list of mutual friends to identify or quantify mutual contacts.

In some embodiments, the media guidance application may monitor electronic communications between a user and a social media network contact. For example, the media guidance application may monitor the electronic communications (e.g., e-mail messages, text messages, microblog posts, posts to a social network website page, etc.) between a first social media network profile, corresponding to the user, and a second social media network profile, corresponding to the social media network contact.

In some embodiments, the electronic communication between a user and a social media contact may be monitored by tracking the exchange of text messages, e-mails or instant messages between a user and a social media contact. In some embodiments, electronic communication between a user and a social media contact may be monitored by tracking posts from one user to another user's social media profiles. In some embodiments, the electronic communication between a user and a social media contact may be monitored by tracking instances when users are "tagged" in a common post. As used herein, the term "tagged" means that a person, group, user or other entity has been labeled as being associated with a post. For example, if the post represents a location, event, function, photo, video etc., a tag may indicate that the entity is or was present. In another example, a tag may mean that the user adding the tag believes the user would be interested in (or "Like") the content of the post. In some embodiments, the electronic communication between a user and a social media contact may be monitored by tracking the click-stream data of the user(s). For example, the media guidance application may monitor the number of times a user visits the profile of the social media contact and/or the number of times a user clicks on content posted or shared by a social media contact. In some embodiments, the media guidance application may monitor a number of different forms of electronic communication simultaneously.

In another example, the media guidance application may identify characteristics of an electronic communication and/or media asset based on object recognition modules incorporated and/or accessible to control circuitry upon which the media guidance application is implemented to determine an interaction or common interest between the user and the social network contact. For example, the media guidance application may include an object recognition module. The object recognition module may use edge detection, pattern recognition, including, but not limited to, self-learning systems (e.g., neural networks), optical character recognition, on-line character recognition (including, but not limited to, dynamic character recognition, real-time character recognition, intelligent character recognition), and/or any other suitable technique or method to determine the characteristics of electronic communications and/or media objects. The media guidance application may apply these techniques to electronic communications (e.g., e-mail messages, text messages, microblog posts, posts to a social network website page, etc.) or media assets (e.g., photos, videos, voice messages, etc.), posted by the social network contact or exchanged between the social network contact and the user.

In some embodiments, the media guidance application may analyze electronic communications for keywords that could suggest connectivity or common interests between a user and a social media contact. For example, the communications may be analyzed for names of the user, and/or social media contact(s), activities, sports, sports teams, athletes, performers, artists, actors, movie titles, show titles, musicians, music groups, song titles, events, venues, etc.

In some embodiments, the media guidance application may employ face recognition technology to analyze media content such as photos or videos. For example, the face recognition technology may determine if the media content posted by the user contains the image of a social network contact and vice versa. Additionally or alternatively, the face recognition technology may determine if media content posted by any user contains the images of both the user and the social network contact. If a media object is a video posted by the user or posted by another on the user's social media network profile, the media guidance application may analyze the media asset frame by frame. For each frame of the video, the media guidance application may use an object recognition module to determine the characteristics associated with each frame (or the media assets as a whole).

In some embodiments, the content-recognition module or algorithm may also include audio analysis and speech recognition techniques, including, but not limited to, Hidden Markov Models, dynamic time warping, and/or neural networks (as described above) to process audio data and/or translate spoken words into text. The content-recognition module may also use any other suitable techniques for processing audio and/or visual data.

In addition, the media guidance application may use multiple types of optical character recognition and/or fuzzy logic, for example, when comparing multiple data fields (e.g., as contained in databases). For example, after the content-recognition module or algorithm translates video and/or audio recordings into text, the media guidance application may cross-reference the translated text with a database to determine a characteristic based on the translated text.

For example, the media guidance application may arrange the text into data fields and cross-reference the data fields with other data fields (e.g., in a lookup table database). The system may determine two fields and/or values to be identical even though the substance of the data field or value (e.g., two different spellings) is not identical. In some embodiments, the system may analyze particular data fields of a data structure or media asset frame for particular values or text. The data fields could be associated with characteristics, other data, and/or any other information required for the function of the embodiments described herein. Furthermore, the data fields could contain values (e.g., the data fields could be expressed in binary or any other suitable code or programming language).

In some embodiments, the media guidance application may generate a closeness metric that quantifies the amount of electronic communication, commons interests and/or mutual friends between the user and the social media network contact. As referred to herein, "a closeness metric" is a metric that quantifies the electronic communication and/or the number of mutual friends between a user and a social network contact. In some embodiments, the closeness metric quantifies the amount of communication between a user and a social network contact. Additionally or alternatively, the closeness metric may quantify the expression of common interests in communications between a user and a social network contact. Additionally or alternatively, the closeness metric may quantify the number of mutual friends between a user and a social network contact. In some embodiments, the closeness metric may indicate a level of friendship between two users. Additionally or alternatively, the closeness metric may indicate a level of shared interests between two users. Additionally or alternatively, the closeness metric may indicate that two users have a high number of mutual friends or acquaintances.

In some embodiments, the communication is between a user and a contact on an online social media network (e.g. Facebook, LinkedIn, Twitter, Pinterest, MySpace, Google Plus, YouTube, Reddit, Flickr, Digg, etc.). In some embodiments, the communication is between a user and a contact from the user's phone contacts and/or email contacts. Alternatively or additionally, the communication is between a user and a user-specified contact. In some embodiments, the user may exclude or remove selected contacts from analysis to determine the closeness metric.

In some embodiments, the media guidance application quantifies the number of communications between a user and a social media contact over a period of time. For example, by measuring the amount and/or frequency of posts, e-mails, tags, clicks, etc., the media guidance application may generate a closeness metric which may be used to determine a particular level of friendship between two users. Two users that communicate often may be expected to be closer friends, and, thus, be more likely to share common interests, than two users that communicate only rarely. For example, a high number or frequency of communications between a user and social media contact may generate a high value for the closeness metric. Conversely, a low number or frequency of communications between a user and a social media contact may generate a low value for the closeness metric. Values of the closeness metric may be calculated as units, counts, points, weights, percentages, ratios, rankings, etc. In some embodiments, the values assigned to the closeness metric for communication between a user and social media contact may be relative to the user's overall amount or frequency of communication. For example, communications sent by a user that frequently communicates with other users may weigh less heavily in a determination of the closeness metric for that user than a user that does not frequently communicate with other users. For example, a user that exchanges an average of 100 electronic communications per day may have a communication between the user and a particular social media contact increase the value of the closeness metric by 0.1 points, while a user that exchanges an average of 10 electronic communications per day may have that same communication increase the value of the closeness metric by 1.0 points. The length of time over which communications may be analyzed may be set by the user or may be a predetermined period such as days, weeks, months or the cumulative time that the media guidance application is used.

In some embodiments, the media guidance application may use various criteria to refine its determination of the level of closeness between two users. For example, the value of the closeness metric may be based on the length of time corresponding to the electronic communications between the user and the social media network contact. For instance, a user who has been communicating with a social media contact over a long period of time such as several months will be assigned a higher closeness metric value than a new contact or a contact with whom the user has only recently started communicating within the last week. In another example, the value of the closeness metric may be based on the number of different types of the electronic communication between the user and the social media contact. For instance, each different type of communication exchanged between a user may increase the closeness metric by 1 point, so two users that exchange a combination of electronic communications such as e-mails, posts and photo tags will be determined to have a closeness metric of 3 points, while two users that only communicate via e-mail will be determined to have a closeness metric of 1 point. In another example, the value of the closeness metric may also be based on a combination of any modes of assessing electronic communication (e.g., the number, frequency, duration, or variety of communications). In yet another example, the different means of electronic communication (e.g., e-mail messages, text messages, microblog posts, or posts to a social network website page) and/or the different modes of assessing electronic communication may be weighted or ranked in closeness metric calculations. For example, each e-mail message may increase the closeness metric by 1.0 points and each post to and/or from a user's social media network page by a greater value (such as 1.5 points) or lesser value (such as 0.5 points). In another example, the directionality of the communication may alter the effect on the value of the closeness metric. For instance, if a user sends a text message communication to a social media contact that may increase the closeness metric by 2 points, while messages from a social media contact to the user may increase the closeness metric by 1 point.

In some embodiments, the closeness metric may alternatively or additionally be based on the number of mutual contacts between the user and the social media contact. One may predict that two users with many mutual friends are closer than two users that only have a few or no mutual friends. For example, each mutual friend may increase the value of the closeness metric. For instance, two users with 15 mutual friends could increase the closeness metric by a value of 1.5 points, while two users with only one mutual friend would increase the closeness metric by only 0.1 points. In another example, the number of mutual friends may be relative to the total number of social network contacts. For instance, a user with 500 total contacts and 50 mutual friends with a particular social network contact may increase the closeness metric by 10 points, while a different social network contact with only 5 friends in common with the user would increase the closeness metric by 1 point.

In some embodiments, the media guidance application may analyze only a subset of the total electronic communications that are relevant to media preferences when determining the closeness metric. For example, using object recognition as discussed above, the media guidance application may identify keywords or images associated with media content (e.g. activities, sports, sports teams, athletes, performers, artists, actors, movie titles, show titles, musicians, music groups, song titles, events, venues, etc.), and then quantify these communications by any of the methods discussed above. For instance, a text message that has been determined to recite the name of a television show or a posted photo that has been determined to depict a sports team may both be determined to be media relevant communications. However, an e-mail that does not contain any keywords or media relevant images, such as a message about the weather or feeling ill would not be classified as a media-relevant communication and not contribute to the closeness metric.

In some embodiments, the media guidance application may store a closeness metric corresponding to the social media network contact in a database. In some embodiments, the media guidance application may rank the social media contacts based on the closeness metric. Furthermore, in some embodiments, the closeness metric may be dynamically updated while stored. For example, in response to a detection of an electronic communication between the user and the social media network contact, the value of the closeness metric may increase. The increase in value of the closeness metric in response to detecting a communication may be relative to the number of recent communications, the number of communications over a predetermined period of time, or may be a cumulative addition to the previously analyzed communications. In contrast, the failure to detect an electronic communication between the user and the social media network contact during a predetermined time period may decrease the value of the closeness metric. The predetermined time period over which a lack of communication may be assessed can be on the order of hours, days, weeks, months, etc. In some examples, the predetermined period of time may be manually set by the user. In other examples, the predetermined period of time may be automatically adjusted based on the calendar data of the user. In yet other examples, the period of time may only be calculated when the user is online.

The media guidance application may retrieve a recommendation threshold from the database and compare the recommendation threshold to the closeness metric. As referred to herein, "a recommendation threshold value" is a minimum value that the closeness metric may possess and/or exceed to determine that a user and a social network contact are sufficiently close to generate a media content recommendation. If the closeness metric for a social media network contact meets and/or exceeds the recommendation threshold, then the contact is determined to be a sufficiently close friend and the media guidance application will generate, for display, on a display device, a media content recommendation based on the social media network contact. Conversely, if the closeness metric for a social media network contact does not meet and/or exceed the recommendation threshold, then contact is not deemed to be a sufficiently close friend and the media guidance application will not generate a media content recommendation based on the social media network contact.

For example, the media guidance application may cross-reference the closeness metric with a database listing recommendation threshold values. In some embodiments, the user may manually adjust the threshold values. For example, the user may adjust the threshold to be generally less stringent or of lower value. The user may alter the threshold value by accessing a menu such as shown in a video mosaic of FIG. 2, which may be one of the selectable options 202, or in a sub-menu after clicking on the "Social Recommendations" option 204. In some embodiments, the recommendation threshold may be automatically adjusted based on the user's number of contacts or frequency of communication. In some embodiments, the recommendation threshold values may increase or decrease based on the user's overall frequency of communication. For example, a closeness metric may correspond to the total number of various electronic communications between a user and a social media contact over a period of time and the recommendation threshold may correspond to a minimum closeness metric value to classify the pair as close friends, given the overall frequency of communication between the user and all social media contacts. In another example, a closeness metric may be crossed-referenced against a database that may list recommendation threshold values that are generated based on a user's communication activity relative to other uses and/or with respect to different forms of electronic communication to determine if the closeness metric meets and/or exceeds the threshold value.

In some embodiments, the closeness metric for a social media network contact will meet and/or exceed the recommendation threshold, and then the media guidance application will generate, for display, on a display device, a media content recommendation based on the social media network contact. The media content recommendations from the social network contact may be based on the preferences, media viewing history, shared media postings, or any other means of assessing the media interests of the social network contact. For example, the media guidance application may receive content received from a social network and/or over the Internet about the media content that has been viewed, liked, shared or posted by the social network contact. For instance, when a social network contact that has been determined to be a close friend watches a movie, this movie may be automatically added to the media content recommendations of the user.

In one example, the media guidance application may access the media interests or preferences that have been posted on a social network profile. For instance, on some social media networks, a user may connect to pages dedicated to actors, performers, movies, genres, activities, interests or other media content. The media guidance application may access and characterize the preferences of social network connection based on the links to profile pages associated with different performers or movies.

In another example, the media guidance application may identify the media preferences of the close friend using object recognition technology as discussed above. For example, the media guidance application may apply these techniques to electronic communications (e.g., e-mail messages, text messages, microblog posts, posts to a social network website page, etc.) or media content (e.g., photos, videos, voice messages, etc.), posted by the close friend. This may allow the media guidance application to identify characteristics of the media content that can indicate the close friend's media preferences such as the movie title, actors, themes, topics, etc. In some instances, the media guidance application may preferentially or exclusively analyze media content or electronic communications exchanged between the social network contact and the user. For example, the media guidance application may generate media content recommendations that are based on media content shared between the user and the social network contact. For instance, if the media guidance application uses object recognition technology to determine that a user and a social network contact discuss football, then the media guidance application may generate recommendations for football games or football-related media.

In another embodiment, the media guidance application may access a user device that tracks the media preference data of the social network contact. For example, the social network contact may have a user device that tracks the media content consumed (or not consumed) and this information is transmitted to the media guidance application to generate media content recommendations. In another example, the user device of the social network contact may output media preference data determined by that user's media guidance application.

In some embodiments, the media guidance application may automatically update media content recommendations with content from selected social network contacts or friends, and display the updated recommendations on a display devise. For example, automatic updates to the media content recommendations may occur in real-time or on the order of minutes, hours, days or weeks. In some cases, the frequency of updates to the media content recommendations generated from friends may be specified by the user. In other embodiments, the user may manually instruct the media guidance application to update the media content recommendations with content from selected social network contacts and display the updated recommendations on a display devise. The media guidance application may display the media content recommendations on a display screen such as shown in FIGS. 1-2.

Figure 2:
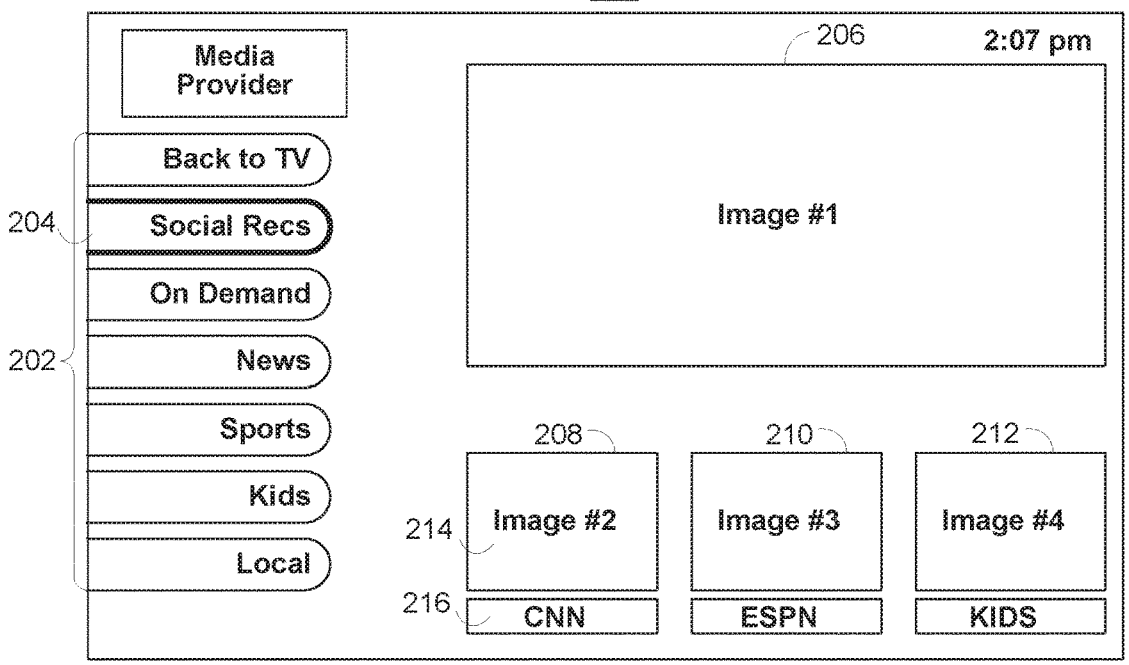
FIG. 2 shows another illustrative example of a display screen generated by a media guidance application in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield, et al., U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, the "Social Recommendations" option 204 is selected, thus providing listings 206, 208, 210, and 212 that are based on the media recommendations of friends of the user. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
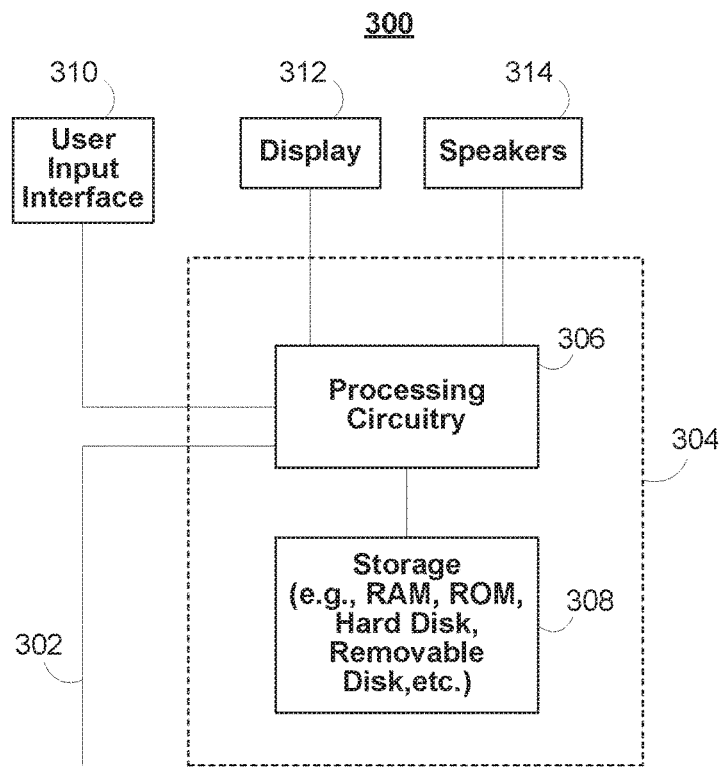
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
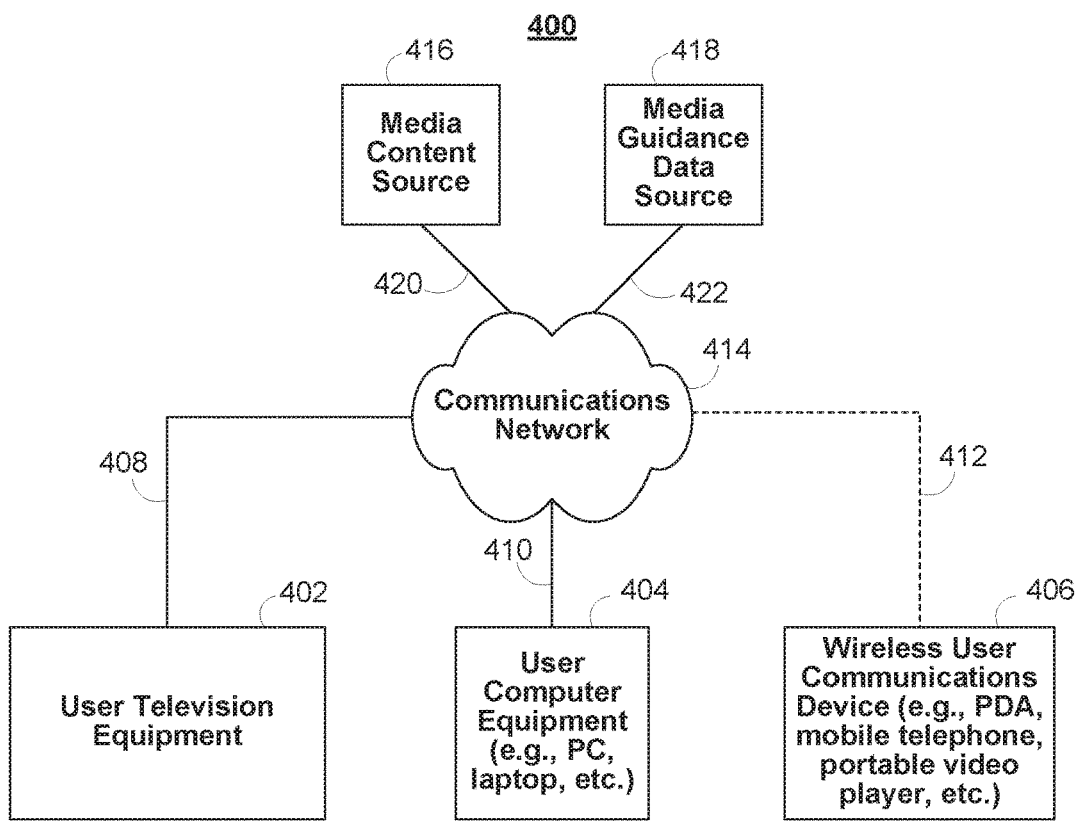
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
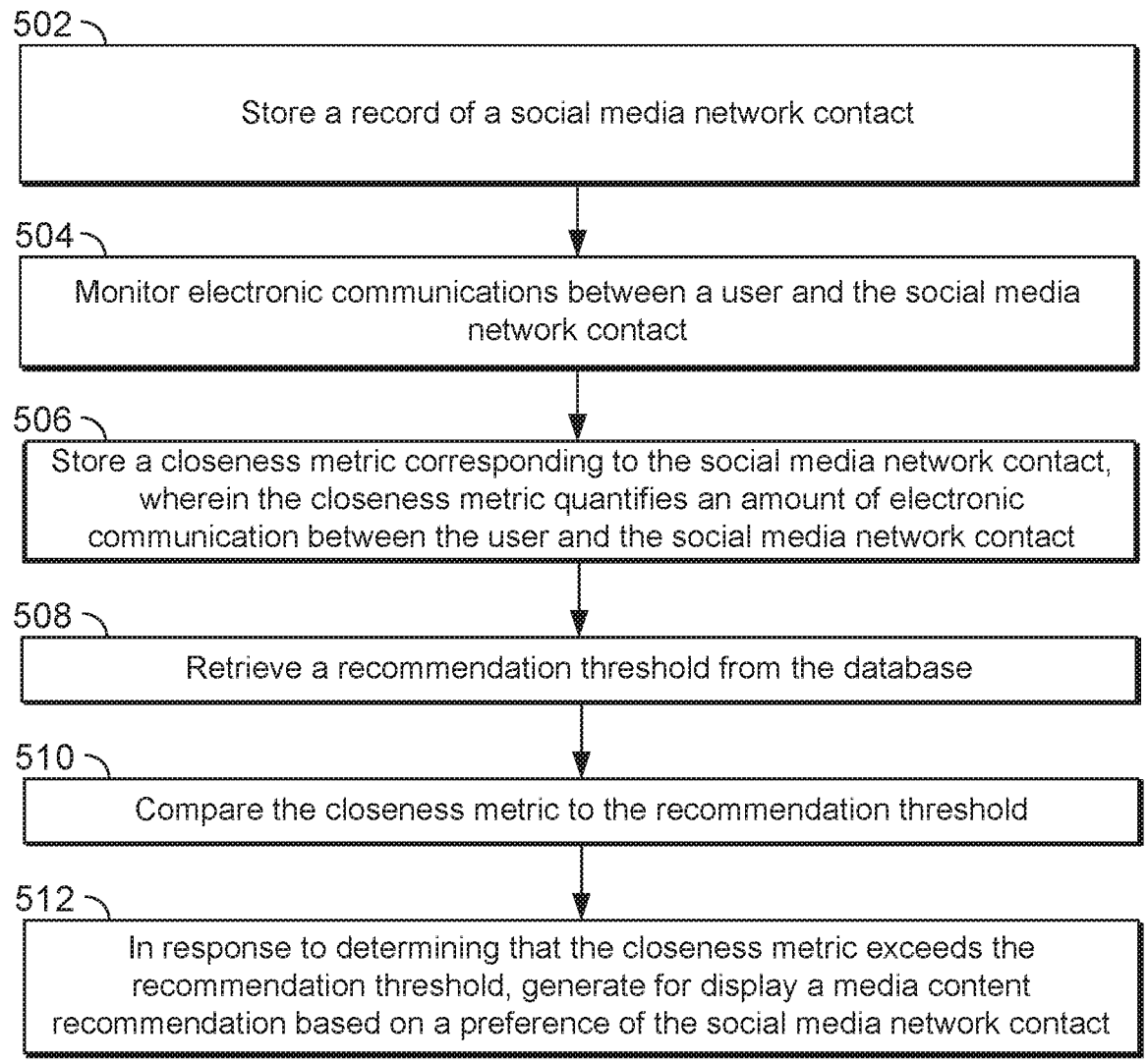
FIG. 5 is a flowchart of illustrative steps for determining whether or not to generate a media content recommendation in accordance with some embodiments of the disclosure.

FIG. 5 is a flowchart of illustrative steps for generating a media content recommendation based on the preference of a social network contact in accordance with some embodiments of the disclosure. It should be noted that process 500, or any step thereof, could be performed on, or provided by, any of the devices shown in FIGS. 3-4. For example, process 500 may be executed by control circuitry 304 (FIG. 3) as instructed by a media guidance application implemented on user equipment 402, 404, and/or 406 (FIG. 4) in order to generate a media content recommendation based on the preference of a social network contact. In addition, one or more steps of process 500 may be incorporated into, or combined with, one or more steps of any other process or embodiment.

At step 502, the media guidance application stores a record of a social network contact. For example, the media guidance application may receive e.g., via user input interface 310 (FIG. 3)) a plurality of inputs, each of which corresponds to a social network contact of the user. For example, the media guidance application may receive a list of friends of the user (e.g., a social network buddy list) and store this list in a storage unit such as depicted in 308 (FIG. 3).

At step 504, the media guidance application monitors electronic communications between a user and the social network contact. For example, the media guidance application may monitor electronic communications such as e-mail messages, text messages, microblog posts, posts to a social network website page, click-stream data, etc., between a user and a social network contact. For example, the media guidance application may monitor the electronic communications between a user and a social network contact on the social network platform.

At step 506, the media guidance application generates a closeness metric that quantifies an amount of electronic communication between the user and the social media network contact and stores this closeness metric in a storage unit such as depicted in 308. For example, the media guidance application may generate a closeness metric by quantifying the number or frequency of electronic communications (e.g., e-mail messages, text messages, microblog posts, posts to a social network website page, click-stream data, etc.) between the user and the social media network contact. For example, the media guidance application may monitor the electronic communications between the user and a social network contact, and for each communication detected increased the closeness metric by a value of 1 point. The value assigned to the electronic communications may be weighted against each other or they may be relative to the overall amount or frequency of electronic communication by the user. For example, a user that frequently communicates, such as exchanging 50-100 total electronic communications per day, each electronic communication detected may increase the closeness metric by only 0.1 points. Whereas for another user that sparing communicates, such as exchanging 1-5 total electronic communications per day, each electronic communication may weigh more heavily and increase the closeness metric by 1.0 points.

At step 508, the media guidance application may retrieve a recommendation threshold from the database. For example, the recommendation threshold may be automatically generated relative to the overall amount or frequency of electronic communication by the user. In another example, the recommendation threshold may be manually adjusted by the user, via a selectable menu option as illustrated in 204. For example, the user could select from a selectable menu option to set the recommendation threshold to high, average or low. A high threshold would be a high value that could select only contacts that the user engages in frequent communication with, whereas a low threshold could select a larger number of social network contact with which a user communicates.

At step 510, the media guidance application may compare the closeness metric to the recommendation threshold in order to determine if the social media network contact is a sufficiently close friend. For example, if the value of the closeness metric exceeds the value of the recommendation threshold then the social media contact would be considered a close enough friend to provide media suggestions to the user. For example, a recommendation threshold could be a ranking that selects the top 5% (or any other user-selected or automatically determined amount) of social network contacts with which the user frequently communicates. As another example, a threshold value may be such that it selects any social network contacts that the user has exchanged 5 or more electronic communications in the last month.

At step 512, in response to determining that a social media network contact is a close friend, the media guidance application may generate for display, on a display device such as illustrated in FIGS. 1-2, a media content recommendation based on the preferences of the close friend. For example, if the close friend "likes" the social network page for a movie, this movie may be then recommended to the user.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 5.

Figure 6:
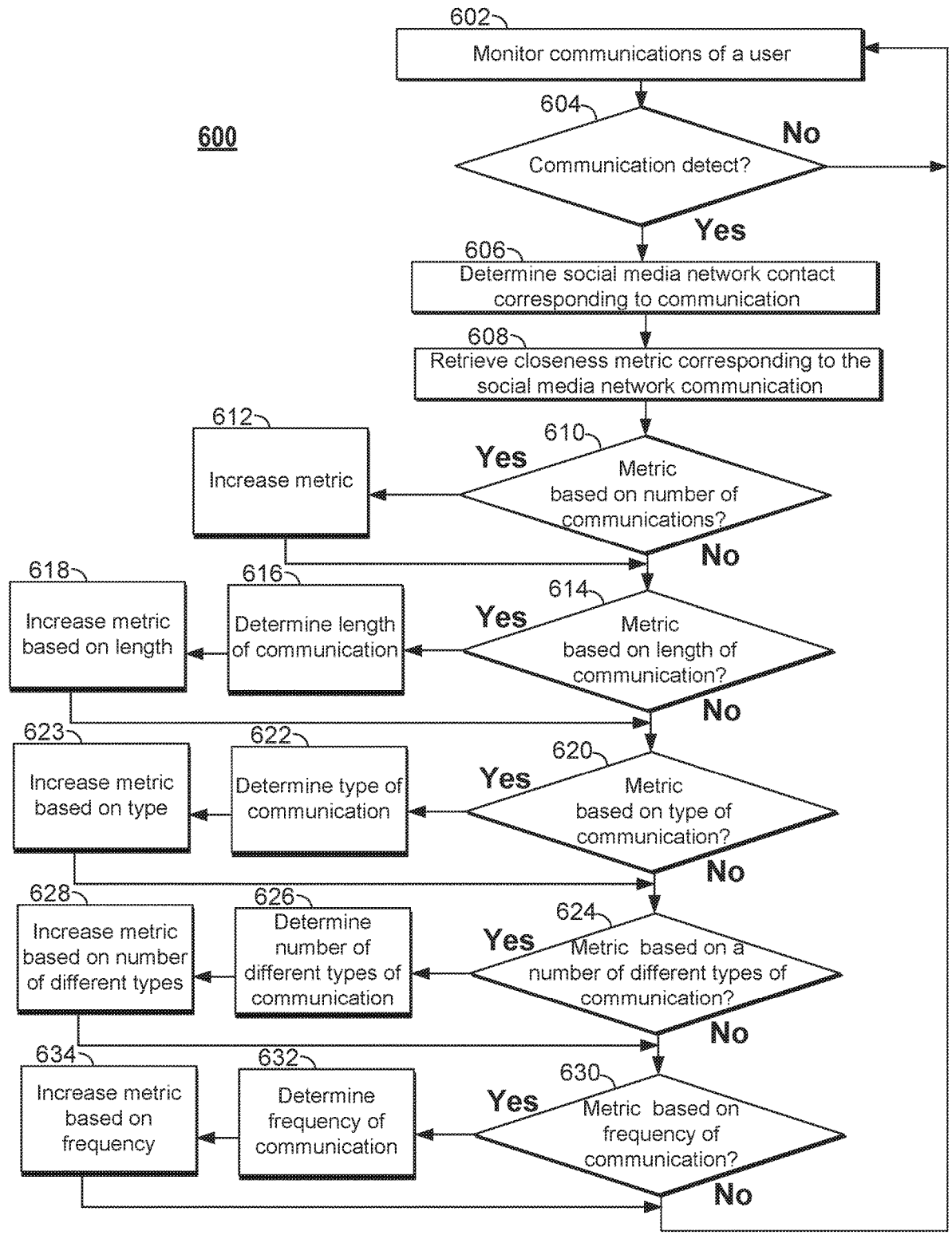
FIG. 6 is a flowchart of illustrative steps for determining criteria upon which to base a decision on whether or not to generate a media content recommendation in accordance with some embodiments of the disclosure.

FIG. 6 is a flowchart of illustrative steps for determining a closeness metric in accordance with some embodiments of the disclosure. It should be noted that process 600 or any step thereof could be performed on, or provided by, any of the devices shown in FIGS. 3-4. For example, process 600 may be executed by control circuitry 304 (FIG. 3) as instructed by a media guidance application implemented on user equipment 402, 404, and/or 406 (FIG. 4) in order to generate a media content recommendation based on the preference of a social media network contact. In addition, one or more steps of process 600 may be incorporated into, or combined with, one or more steps of any other process or embodiment.

At step 602, the media guidance application monitors electronic communications (e.g., e-mail messages, text messages, microblog posts, posts to a social network website page, click-stream data, etc.), between a user and other social media network contacts. For example, the media guidance application may monitor the electronic communications between a user and a social network contact on an online social network platform such as Facebook, LinkedIn, Twitter, etc.

At step 604, if the media guidance application detects an electronic communication between a user and other social media network contacts, it can continue onto step 606. If no electronic communication is detected, it will revert back to step 602 of monitoring electronic communications of the user. For example, if the media guidance application detects that the user sent an e-mail or a message was posted to the profile wall of the user on a social network platform.

At steps 606 and 608, the media guidance application determines the social media network contact corresponding to the communication and retrieves the closeness metric corresponding to the social media network contact. For example, in response to the detection of an electronic communication, the media guidance application then identifies the social network contact with whom the electronic communication was exchanged. The media guidance application may then retrieve the closeness metric associated with that social network contact from a database, such as a storage unit as depicted in 308 (FIG. 3).

At steps 610-634, the media guidance application generates a closeness metric that quantifies an amount of electronic communication between the user and the social media network contact. Steps 610, 614, 620, 624 and 630 illustrate different features of electronic communications that may be assessed, such as the number of communications (610), the length of communication (614), the type of communication (620), the number of different types of communications (624) or the frequency of communications (630). Each of these different features of electronic communication may be evaluated in a step-wise fashion. For example, when an electronic communication is detected, the media guidance application determines the identity of social network contact with whom the communication is exchanged and then retrieves the closeness metric associated with that user. The media guidance application then may proceed through a series of steps to determine how the communication will affect the value of the closeness metric. For example, if in step 610, the metric is determined to be based on the number of communications, then it may proceed directly to step 612 to increase the closeness metric and then continue onto step 614. If, in step 610, the closeness metric is not determined to be based on the number of communications, then the process continues directly onto step 614.

At step 614, it is evaluated whether the metric is based on the length of the communication. If the metric is based on the length of communication, then it may proceed to step 616 to determine the length of communication and, subsequently, step 618 to increase the metric based on the length of communication. For example, if the closeness metric is based on the length of communication and the communication is an e-mail, the media guidance application may assess the number of characters that are in the e-mail. For instance for an e-mail communication that is between 100-200 characters may increase the metric value by 1 point, whereas e-mail messages <100 characters may increase the metric by 0.5 points. After the increase in the metric value at step 618, then it may proceed to step 620. If, in step 614, the metric is not determined to be based on the length of communication, it may proceed directly to step 620.

At step 620, it is evaluated if the metric is based on the type of communication. If the metric is based on the type of communication, then it may proceed to step 622 to determine the type of communication and subsequently step 623 to increase the metric based on the type of communication. For example, if the closeness metric is based on the type of communication, and the type of communication is a post on the user's social network profile wall, then the media guidance application will increase the metric by the value associated with wall posts. For example each social media network wall post may increase the closeness metric by 2 points, while each text message may increase the metric by 1 point. After the metric value at step 623 is increased, then it may proceed to step 624. If, in step 620, the metric is not determined to be based on the type of communication, it may proceed directly to step 624.

At step 624, it is evaluated whether the metric is based on a number of different types of communications. If the metric is based on the number of different types of communications, then it may proceed to step 626 to determine the number of different types of communication and, subsequently, to step 628 to increase the metric based on the number of different types of communications. For example, if the electronic communication is the tagging of the user in the photo and the metric is based on the number of different types of communication, then the media guidance application may determine if the user has previously been tagged in photos by this contact before, and if not then increase the closeness metric. After the metric value is increased at step 628, then it may proceed to step 630. If, in step 624, the metric is not determined to be based on the number of different types of communications, it may proceed directly to step 630.

At step 630, it is evaluated whether the metric is based on the frequency of communication. If the metric is based on the frequency of communication, then it may proceed to step 632 to determine the frequency of communication and, subsequently, to step 634 to increase the metric based on the frequency of communication. For example, if the closeness metric is based on the frequency of communication, then in response to the detection of a new communication, the media guidance application will determine when the last communication between the user and that social contact occurred and increase the metric by a value relative to the number of communications over time between the user and the contact. After the metric value is increased at step 634, then it may return to step 602 to monitor the communications of a user. If, in step 630, the metric is not determined to be based on the frequency of communication, it may directly return to step 602 to repeat the process and continue to monitor the electronic communications of a user.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or, substantially, simultaneously to reduce lag or increase the speed of the system or method. Furthermore, it should be noted that any of the devices or equipment discussed in relation to FIGS. 3-4 could be used to perform one or more of the steps in FIG. 6.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted, the systems and/or methods described above may be applied to, or used in accordance with, other systems and/or methods.

What is claimed is:

1. A method of recommending media content, the method comprising:
   storing, in a database, a record of a social media network contact of a user;
   storing, in the database, a closeness metric corresponding to the social media network contact, wherein the closeness metric is based on a number of mutual friends between the user and the social media network contact;
   retrieving a recommendation threshold from the database, wherein the recommendation threshold is a minimum value of the closeness metric required to determine that the user and the social media network contact are sufficiently close for generating media content recommendations;
   adjusting the recommendation threshold based on any one of an automatic adjustment based on the number of mutual friends or based on a predetermined recommendation threshold;
   comparing the closeness metric to the adjusted recommendation threshold; and
   in response to determining that the closeness metric exceeds the adjusted recommendation threshold, generating for display, on a display device, a media content recommendation based on a determined preference of the social media network contact.

2. The method of claim 1, further comprising determining the value of the closeness metric based on the number of mutual friends.

3. The method of claim 1, further comprising cross-referencing the record of the social media network contact with a database listing preferences of social media network contacts to determine the preference of the social media network contact.

4. The method of claim 1, further comprising:
   accessing media interests posted on a social media profile of the social media network contact; and
   determining the preference of the social media network contact based on the posted media interests.

5. The method of claim 1, further comprising:
   accessing a media consumption history of the social media network contact; and
   determining the preference of the social media network contact based on the media consumption history of the social media network contact.

6. The method of claim 1, further comprising:
   accessing content posted on a social media profile of the social media network contact;
   determining whether the content posted on the social media profile of the social media network contact is related to media content;
   in response to determining that the content posted on the social media profile of the social media network contact is related to media content, determining a characteristic of the media content; and
   determining the preference of the social media network contact based on the characteristic of the media content.

7. The method of claim 1, further comprising:
   accessing an electronic communication between the social media network contact and the user;
   determining whether the electronic communication includes a reference to media content;
   in response to determining that the electronic communication includes a reference to media content, determining a characteristic of the media content; and
   determining the preference of the social media network contact based on the characteristic of the media content.

8. A system for recommending media content, the system comprising:
   control circuitry; and
   a memory storing instructions, which when executed by the control circuitry, cause the control circuitry to:
   store, in a database, a record of a social media network contact of a user;
   store, in the database, a closeness metric corresponding to the social media network contact, wherein the closeness metric is based on a number of mutual friends between the user and the social media network contact;
   retrieve a recommendation threshold from the database, wherein the recommendation threshold is a minimum value of the closeness metric required to determine that the user and the social media network contact are sufficiently close for generating media content recommendations;
   adjust the recommendation threshold based on any one of an automatic adjustment based on the number of mutual friends or based on a predetermined recommendation threshold;
   compare the closeness metric to the adjusted recommendation threshold; and
   in response to determining that the closeness metric exceeds the adjusted recommendation threshold, generate for display, on a display device, a media content recommendation based on a determined preference of the social media network contact.

9. The system of claim 8, wherein the instructions, when executed by the control circuitry, further cause the control circuitry to determine the value of the closeness metric based on the number of mutual friends.

10. The system of claim 8, wherein the instructions, when executed by the control circuitry, further cause the control circuitry to cross-reference the record of the social media network contact with a database listing preferences of social media network contacts to determine the preference of the social media network contact.

11. The system of claim 8, wherein the instructions, when executed by the control circuitry, further cause the control circuitry to:
   access media interests posted on a social media profile of the social media network contact; and
   determine the preference of the social media network contact based on the posted media interests.

12. The system of claim 8, wherein the instructions, when executed by the control circuitry, further cause the control circuitry to:
   access a media consumption history of the social media network contact; and
   determine the preference of the social media network contact based on the media consumption history of the social media network contact.

13. The system of claim 8, wherein the instructions, when executed by the control circuitry, further cause the control circuitry to:
   access content posted on a social media profile of the social media network contact;
   determine whether the content posted on the social media profile of the social media network contact is related to media content;

in response to determining that the content posted on the social media profile of the social media network contact is related to media content, determine a characteristic of the media content; and determine the preference of the social media network contact based on the characteristic of the media content.

14. The system of claim 8, wherein the instructions, when executed by the control circuitry, further cause the control circuitry to:

access an electronic communication between the social media network contact and the user;

determine whether the electronic communication includes a reference to media content;

in response to determining that the electronic communication includes a reference to media content, determine a characteristic of the media content; and determine the preference of the social media network contact based on the characteristic of the media content.

* * * * *